United States Patent [19]

Frohlich

[11] Patent Number: 5,254,001

[45] Date of Patent: Oct. 19, 1993

[54] HOT REPLACEABLE TUCKSTONES FOR INDUSTRIAL FURNACES

[75] Inventor: H. Gunter Frohlich, Cincinnati, Ohio

[73] Assignee: Dyko Industriekeramik GmbH, Dusseldorf, Fed. Rep. of Germany

[21] Appl. No.: 852,382

[22] Filed: Mar. 16, 1992

[30] Foreign Application Priority Data

Feb. 17, 1992 [DE] Fed. Rep. of Germany ....... 4200243

[51] Int. Cl.⁵ .................................................. F27D 1/00
[52] U.S. Cl. ..................................... 432/247; 432/248; 432/251; 432/252
[58] Field of Search ................ 432/248, 251, 252, 247

[56] References Cited

U.S. PATENT DOCUMENTS

| | | | |
|---|---|---|---|
| 2,024,595 | 12/1935 | Petit | 432/247 |
| 3,315,950 | 4/1967 | Potocnik et al. | 432/252 |
| 3,684,262 | 8/1972 | Busby | 432/248 |
| 4,505,210 | 3/1985 | Schuck et al. | 432/251 |
| 4,874,313 | 10/1989 | Schwenninger | 432/252 |

Primary Examiner—Henry C. Yuen
Attorney, Agent, or Firm—Hopkins & Thomas

[57] ABSTRACT

A tuckstone assembly (14) for an industrial type furnace (10) fills a space between a wall of the furnace and a supporting member (19) that supports the furnace superstructure. The tuckstone assembly (14) has a support block (26) having a sloped upper surface (27) and a nose block (37) having a mating sloped lower surface (38). The longitudinal profile of the tuckstone is reduced for insertion in the space of the furnace wall by sliding the nose block forwardly, and the enlarged nose portion (42) is made to cover the support plate (19) by sliding the nose block (37) back to where the ends of the support block and the nose block substantially coincide.

25 Claims, 5 Drawing Sheets

HOT REPLACEABLE TUCKSTONES FOR INDUSTRIAL FURNACES

FIELD OF THE INVENTION

This invention relates to industrial furnace construction elements and, more particularly, to refractory blocks, i.e., tuckstones, placed adjacent steel supporting members of an industrial furnace for protecting the supporting members from extreme heat.

BACKGROUND OF THE INVENTION

In general, industrial furnaces are constructed to have three main sections, the tank at the lower portion of the furnace, the intermediate superstructure, and the crown positioned over the superstructure. In general, the tank and superstructure define a heating chamber. Supporting steel elements, such as channel irons for supporting the crown, and steel plates for supporting the superstructure sidewalls, function to allow the three main sections of the furnace to be independent of each other, thereby allowing separate maintenance on the three sections.

Heretofore, the conventional way to protect supporting steel members, especially the steel support plate extending over the tank and supporting the superstructure, from extreme heat has been to place refractory blocks called "tuckstones" on top of the support steel support plate, and the remaining refractory blocks that form the superstructure on top of the tuckstones. The prior art tuckstone generally is approximately L-shaped with a body portion that rests on the metal support plate and a nose portion which extends over and down in front of the metal support plate on the interior side within the furnace which protects the metal support plate from direct exposure to the extreme heat in the furnace. Replacement of the tuckstones is necessitated, especially in the case of continuous furnace campaigns, because of their susceptibility to thermal shock cracking, which eventually can lead to loss of the noses of the tuckstones, and hence loss of protection for the metal support plate. Such damage to the tuckstones and subsequent damage to the support plate can lead to reduced furnace life, or to expensive hot welding repairs of the metal support plate, or to the installation of expensive cooling coils adjacent the tuckstones which must be replaced as they deteriorate.

Inasmuch as the tuckstones are placed on top of the metal support plate, they form a part of the superstructure, and usually when the tuckstones are to be replaced they cannot be removed without removal of that portion of the superstructure which rests upon them. One example of a furnace structure is shown in U.S. Pat. No. 4,213,753 of Negroni et al wherein the tuckstones apparently support the superstructure.

The use of tuckstones having depending noses which extend over the inner edges of the horizontal metal support plate creates a tuckstone ledge or shelf which necessitates a step back superstructure within the furnace, thereby reducing furnace capacity, and the tuckstone ledge forms an area within the furnace where corrosive chemicals may be deposited, which in turn can contaminate the melt. These corrosive materials can be of particular concern in the case of glass furnaces. When, during operation of the furnace, the nose of a tuckstone breaks off the main body of the tuckstone and if the broken tuckstone is not replaced, flux line corrosion of the top rim of the tank sidewall can occur, thereby exposing the flux line (top surface of the melt) to direct flame contact which can reduce convection and reduce melt output per time unit. In addition, there will be an increase of energy consumption per melt unit.

It therefor can be seen that it would be desirable to provide a furnace construction wherein the tuckstones can be expediently removed, inspected and replaced, even when the furnace is hot.

SUMMARY OF THE INVENTION

Briefly described the present invention comprises an industrial furnace having an interior heating chamber wherein the superstructure of the furnace is directly supported by a laterally extending steel support plate, and tuckstone assemblies of the invention are mounted with the nose portion of each tuckstone assembly facing the heating chamber of the furnace in a space below the support plate so that the tuckstone assemblies do not directly support the superstructure of the furnace. The spaces in which the tuckstone assemblies are mounted are formed between the top of the side wall of the furnace tank and the bottom of the support plate. In the disclosed embodiments the support plate has a plurality of hanger tracks affixed to the bottom surface thereof and the tuckstone assemblies are suspended from the hanger tracks by means of hangers, and the hangers are movable within the tracks toward and away from the interior heating chamber of the furnace. Each tuckstone assembly comprises a lower support block with its front end facing the interior heating chamber of the furnace and its rear end extending toward the exterior of the furnace and having a sloped upper surface extending from the front interior end to the rear exterior end of the block. A movable nose block is supported by the support block and includes a main body portion with a lower sloped surface which has a reverse slope as that of the support block and the lower sloped surface of the nose block is supported on the sloped surface of the support block, and the nose block includes a nose portion that extends upwardly from the main body portion to shield the metal support plate.

The sloped surfaces of the nose block and the support block preferably are curved and mate to form a slip joint between the nose block and support block whereby forward movement of the nose block into the furnace past the front end of the support block causes the nose block, and particularly the upwardly extending nose portion of the nose block, to follow a downwardly sloped path. As a consequence, the height of the tuckstone assembly is decreased to the extent that the tuckstone assembly can be inserted into an empty space below the support plate from which it is suspended and after insertion the upper movable nose block is pulled back along the upper sloped surface of the support block into its high profile operative position until the upwardly projecting nose portion covers and shields the interior edge of the metal support plate, thereby protecting it.

In the disclosed embodiment, the nose portion of the tuckstone fits into a recess in the block of the superstructure immediately above the support plate, with the front end of the assembly facing the heating chamber and the rear end extending toward the exterior of the furnace.

Removal of the tuckstone assembly is accomplished by sliding the nose block and the support block with respect to each other until the vertical dimensions of the tuckstone assembly are less than the vertical dimensions of the opening in the furnace wall into which the tuckstone assembly is inserted. After the vertical dimensions of the tuckstone assembly have been reduced to less than the predetermined height of the opening, the tuckstone assembly can be withdrawn outwardly through its opening beneath the metal support plate.

In the disclosed embodiment, slotted tracks are mounted to the downwardly facing surface of the metal support plate and each tuckstone assembly is supported by a support bracket which has a T-shaped hanger adapted to ride in a slotted track along the bottom side of the support plate. The support bracket, which has a generally inverted U-shaped configuration, slidably grips the tuckstone support block while permitting free movement of the nose block along the sloped surface of the support block, yet the exterior portion of the nose block is shaped so as to engage the support bracket when moved to its innermost position in the furnace, thereby serving to limit the forward movement of the nose block.

In the disclosed embodiments of the invention the mated sloped surfaces of the nose block and support block that form the slip joint are curved so that the nose portion of the nose block progressively tilts to a lower height as the nose block is moved with respect to the support block and into the heating chamber of the furnace.

An industrial furnace ordinarily is not formed in a round shape but can have several corners, including both inwardly projecting and outwardly projecting corners. In order to realize complete tuckstone protection it is necessary that the tracks on the underside of the metal support plate be oriented at oblique angles to allow insertion of the tuckstone assemblies at the proper locations about the furnace. Where such angular orientations occur, the corresponding tuckstone assembly is suspended from the tracks on the support plate by round headed pins instead of T-hangers with the heads of the pins positioned in the slotted tracks, thereby making it possible for the tuckstone assemblies to be moved along the tracks without jamming against adjacent tuckstones.

It is therefore an object of the present invention to protect the metal support plate of a furnace with tuckstone assemblies that are independent of the remaining refractory structure and thus are independently replaceable.

It is another object of the present invention to increase the capacity of a furnace and reduce corrosive deposits thereon by elimination of the tuckstone ledge.

A further object of the present invention is to increase furnace capacity and to extend furnace life while maintaining a substantially constant energy consumption rate.

Another object of the invention is to provide a furnace with a tuckstone assembly that can be expediently and independently replaced without disturbing the superstructure of the furnace.

Another object of the invention is to provide a furnace that can have its tuckstones replaced substantially without disturbing the other components of the furnace.

These and other objects, features and advantages of the present invention will be readily apparent from the following detailed description, read in conjunction with the accompanying drawings.

DETAILED DESCRIPTION

Figure 1A:
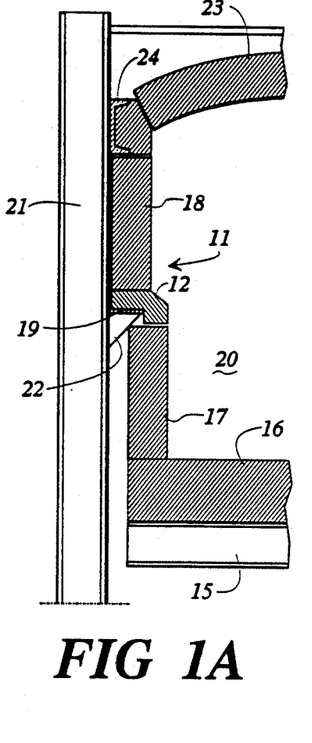
FIGS. 1A and 1B are opposite walls of an industrial furnace with FIG. 1A showing a prior art tuckstone and FIG. 1B showing an embodiment of the tuckstone assembly of the invention.
Figure 1B:
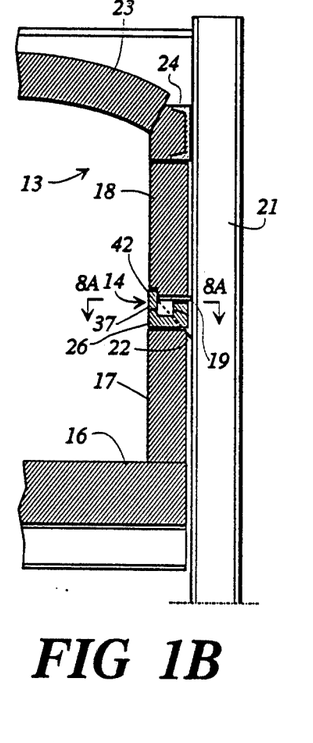

Referring now in more detail to the drawings, in which like numerals indicate like parts throughout the several views, FIG. 1A illustrates a cross-section of a conventional furnace wall structure 11, having a conventional tuckstone arrangement 12, whereas FIG. 1B illustrates a cross-section of a furnace wall 13 having the tuckstones 14 of the present invention.

Furnace structure 11 is supported by suitable support means 15 and comprises a floor 16 made of suitable refractory material and having sidewall blocks 17 (FIG. 4) extending upwardly therefrom to form the furnace tank 20. Above the furnace tank is the superstructure 18 which comprises refractory blocks mounted on and supported by a tuckstone 12 which is, in turn, supported by steel support plate 19. Together the interior of the tank 20 and superstructure 18 form the furnace heating chamber. Support plates 19 are in turn supported by elongated vertically extending buckstays 21 to which the support plates preferably are welded. Triangular brackets 22 which are welded to support plates 19 and to buckstays 21 provide further support for plates 19.

As can be seen in the conventional arrangement depicted on the left side of FIG. 1, the nose of the conventional tuckstone 12 is relatively thick, which is for the function of reducing thermal shock cracking while protecting plate 19. This large thickness is necessary inasmuch as tuckstone 12 is not replaceable, as noted in the foregoing, and, because of the large thickness, the tank wall 17 must be stepped inwardly, as shown, to achieve a smooth transition from wall 17 to the nose of tuckstone 12. Stepping wall 17 inwardly reduces tank capacity, causes the interior surface of the tank wall to be coextensive with the nose of the tuckstone.

On the other hand, in the construction of the new furnace 13 of the present invention, the tuckstone assembly 14 does not require an inordinately thick nose inasmuch as the new tuckstone assembly is readily replaceable, as will be apparent hereinafter. As a consequence, of the smaller nose of the new tuckstone assembly, it is not necessary that wall 17 be stepped inwardly, thus the tank capacity is greater than that of conventional system 11.

Figure 2A:
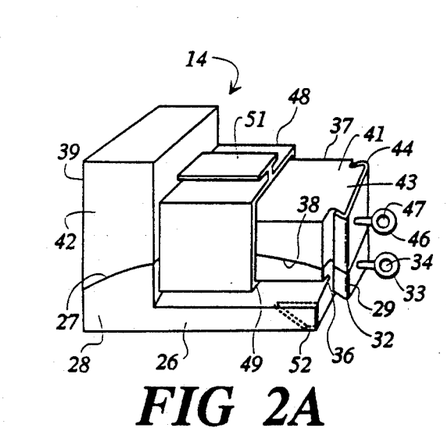
FIG. 2A is a perspective view of the tuckstone assembly of the present invention in its operative position.
Figure 2B:
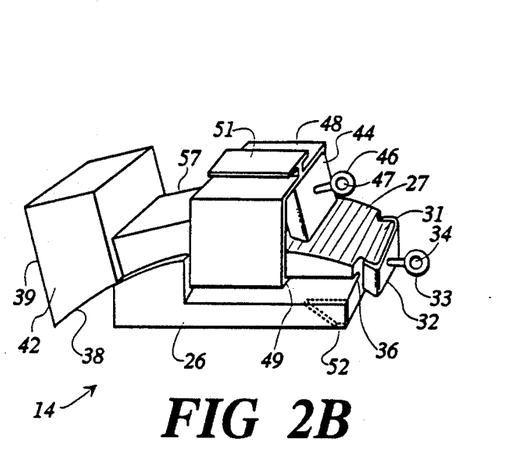
FIG. 2B is a perspective view of the tuckstone assembly of FIG. 2A but in its low profile insertable and removable position.

FIG. 2A illustrates the tuckstone assembly 14 of the present invention in its high profile operative configuration with the nose of the nose block facing the heating chamber, and FIG. 2B illustrates the same tuckstone assembly in its low profile insertion or removal configuration. As shown, tuckstone assembly 14 comprises a support block 26 having a sloped convex upper or top surface 27 shaped as a segment of a circle extending from the front end 28 of the block 26 to the rear end 29. Rear end 29 is formed with a dovetail 31, as best seen in FIG. 2B, to which is affixed a metal holding bracket 32 which mates with dovetail 31. Mounted on bracket 32 is a pull pin 33 formed with an eye 34. Mounting grooves 36 extend longitudinally of block 26 on opposite sides thereof from the rear end 29 toward the front. Only one mounting groove 36 is shown in FIGS. 2A and 2B.

A movable nose block 37 rests atop support block 26. Nose block 37 has a concave lower surface 38, shaped as a segment of a circle of the same radius as that of surface 27 of block 26, and the lower concave surface of the nose block extends from the front nose surface 39 to the rear 41 of block 37. The two mating surfaces 27 and 38 form an elongated curved slip joint. The front end 39 of nose block 37 has a nose 42 which, as shown in FIG. 1B, is adapted to cover and protect support plate 19. Rear end 41 of block 37 is provided with a dovetail 43 for retaining a holding bracket 44 which mates therewith. Bracket 44 has affixed thereto a pull pin 46 having an eye 47.

A support bracket 48, having the general configuration of an inverted U, has a pair of inwardly extending flanges 49 on the distal ends of the depending arms, only one of which is shown, which ride in grooves 36 on opposite sides of block 26. The inner dimensions of support bracket 48, i.e., the spacing between the downwardly extending legs of the inverted U, are such that nose block 37 is free to move longitudinally without interference, and the outer width dimensions of bracket 48 are less than the width of nose 42 and block 26. On top of bracket 48 is affixed a T-hanger 51 which is adapted to ride in tracks on the underside of support plate 19, as will be discussed more fully hereinafter.

When tuckstone assembly 14 is to be installed adjacent a triangular bracket 22, as seen in FIG. 1, it is necessary, to avoid any interference therebetween, that cut-outs 52, shown in dotted lines in FIGS. 2A and 2B, be made toward the rear of block 26, to provide clearance for the bracket 22.

Figure 3A:
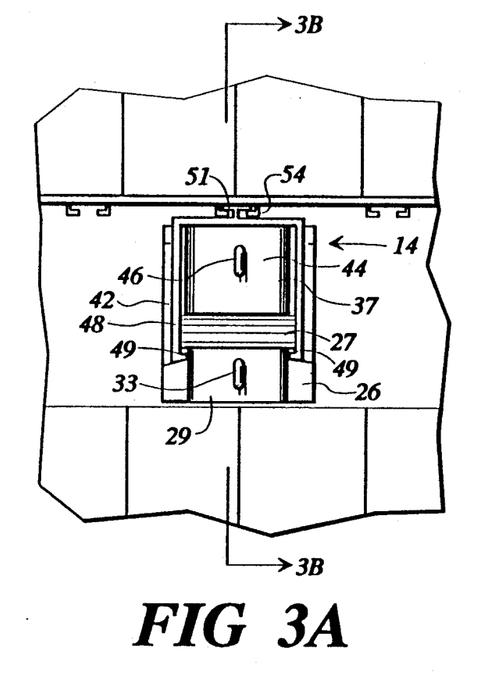
FIG. 3A is a rear end elevation view of the tuckstone assembly of the invention as it appears from outside the furnace when being inserted in place in the furnace.
Figure 3B:
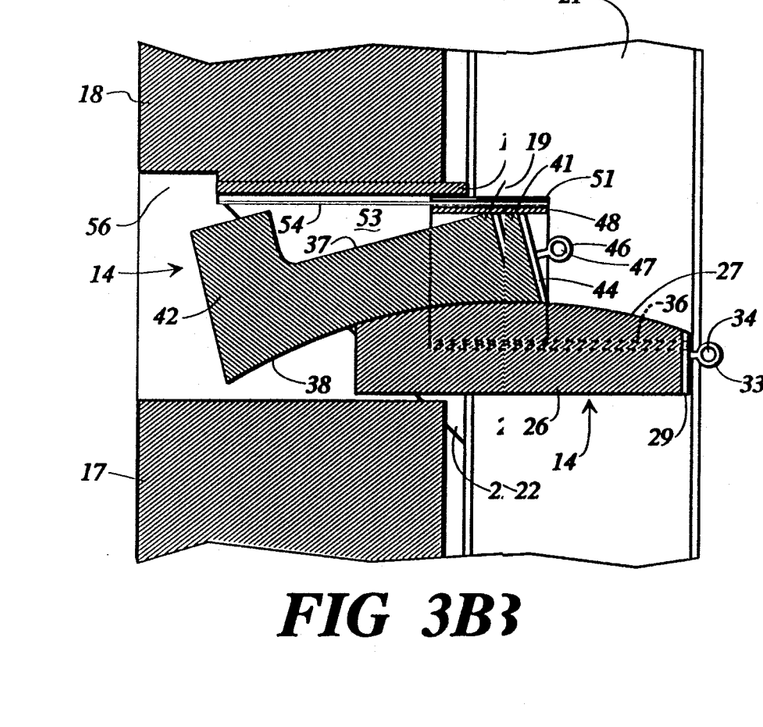
FIG. 3B is a side sectional view along the line 3B—3B of FIG. 3A.

FIG. 3A is a rear end view of the tuckstone assembly of FIGS. 2A and 2B, and FIG. 3B is a side elevation view along the line 3B—3B in FIG. 3A, with the tuckstone assembly 14 in its insertable and removable position. As can be seen, especially in FIG. 3B, for insertion into the opening 53 below support plate 19, nose block 37 and support block 26 are slid with respect to each other along their slip joint so that nose portion 42 follows a downward curving path, reducing the profile of tuckstone assembly 14 to a height less than the height of opening 53. Bracket 48 serves to block the rear end 41, as shown in FIG. 3B, thereby preventing nose block 37 from being moved too far forward to where it could disengage from support block 26. As shown in FIG. 3B, after nose block 37 has been moved forwardly, T-hanger 51 is inserted into a slotted track 54 mounted to the underside of support plate 19, and the entire tuckstone assembly 14 in its low profile configuration then can be moved into its operative position within opening 53. After tuckstone 14 is in position, movable block 37 can be pulled back into its operative configuration by means of pin 46 until nose portion 42 fits snugly within a recess 56 in the superstructure 18, thereby providing a stepless transition from superstructure 18 to side wall block 17, which defines the tank portion of oven 13.

Figure 4:
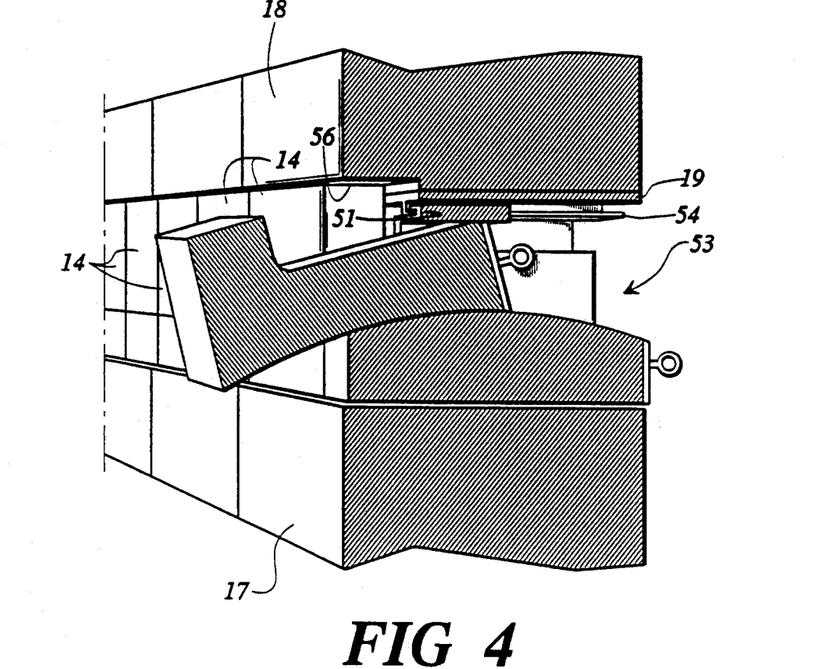
FIG. 4 is a perspective view of the tuckstone assembly of FIGS. 3A and 3B.

FIG. 4 illustrates a tuckstone assembly 14 that has been fully inserted into opening 53 with T-hanger 51 at the forward end of track 54, but not yet placed in its operative position. As can be seen in FIG. 4, several other tuckstone assemblies 14 are in place in their operative positions.

Figure 5:
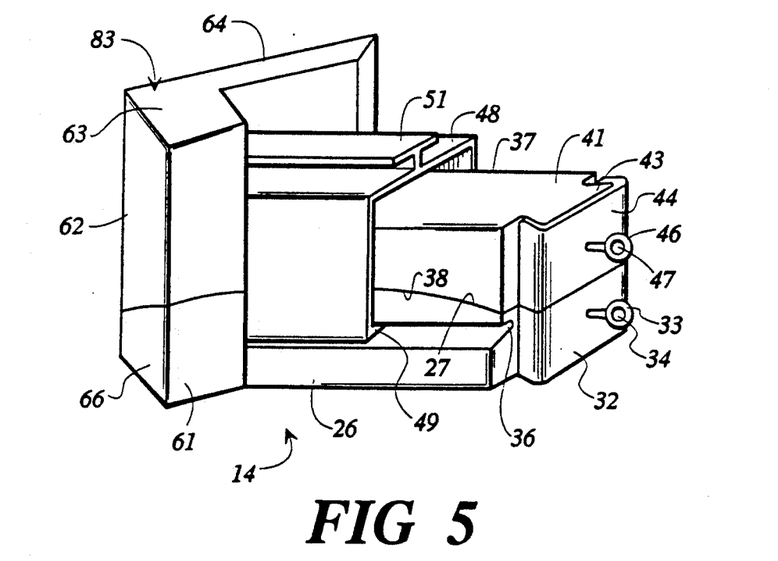
FIG. 5 is a perspective view of a tuckstone assembly configured to fit in an inwardly projecting corner within the furnace.

FIG. 5 depicts a tuckstone assembly 14 of the invention configured to form a ninety degree (90°) inwardly projecting corner 83 of the furnace wall (FIG. 8B) in its operative position. The structure of assembly 14 is basically identical to that shown in FIG. 2A, with the exception of the front ends 61 and 62 of blocks 26 and 37 respectively. As can be seen, front end 62 of block 37 has first and second legs 63 and 64 which form a ninety degree (90°) angle nose portion, and front end 61 of block 26 has legs 66 and 67, only 66 being shown, which coincide with legs 63 and 64 to form a smooth surface in the operative position.

Figure 6:
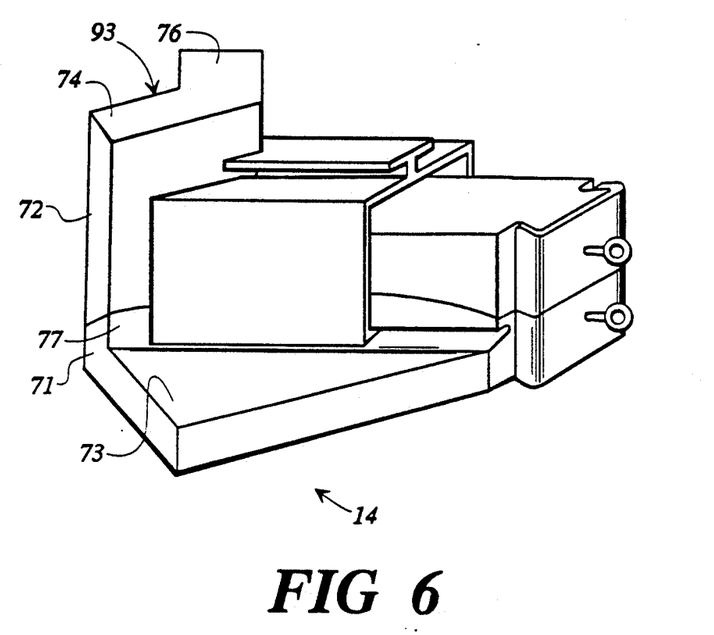
FIG. 6 is a perspective view of a tuckstone assembly of the invention adapted to fit into an outwardly projecting corner within the furnace.

In FIG. 6 there is shown a tuckstone assembly 14 configured to form a ninety degree (90°) outwardly projecting corner 93 of the furnace wall (FIG. 8B) in the operative position. As in the case of the inside corner configuration of FIG. 5, the assembly 14 of FIG. 6 is basically the same as that of the assembly of FIG. 2A, with the exception of the front ends 71 and 72 of blocks 26 and 37 respectively. In addition, block 26 has skirts 73 on opposite sides thereof against which adjacent tuckstones bear, as can be seen more clearly in FIG. 8. As can be seen in FIG. 6, front end 72 has first and second arms 74 and 76 which meet to form a ninety degree (90°) angle. Front end 71 likewise has two arms 77 and 78 (only arm 77, being shown) forming a ninety degree (90°) angle to form a smooth front end nose portion of assembly 14 with arms 74 and 76. While the corner tuckstones of FIGS. 5 and 6 depict 90° corners, it is to be understood that if the furnace has other than 90° corners, the angles formed by arms 63, 64 and 66, 67 and 76, 76 and 77, 78 can be made to conform to the corner angles of the furnace.

Figure 7:
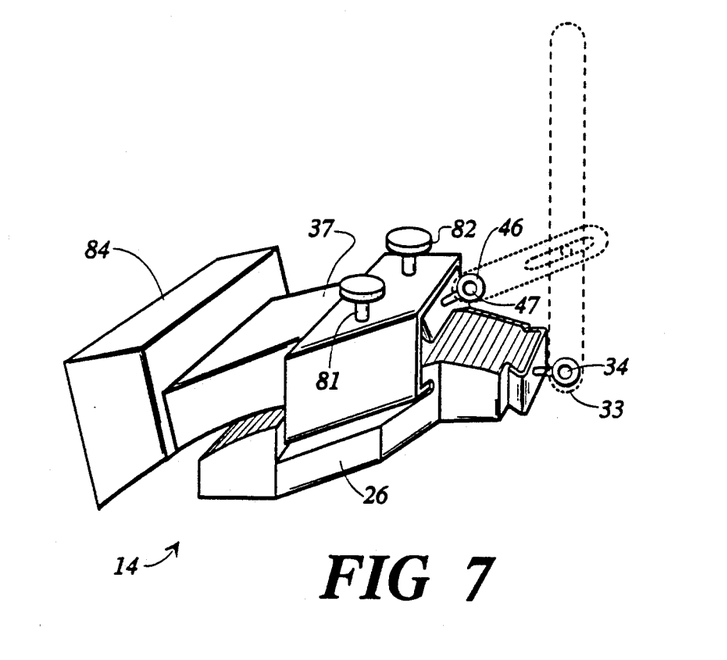
FIG. 7 is a perspective view of a tuckstone assembly of the invention having hanger pins instead of T-shaped hangers.
Figures 8A, 8B:
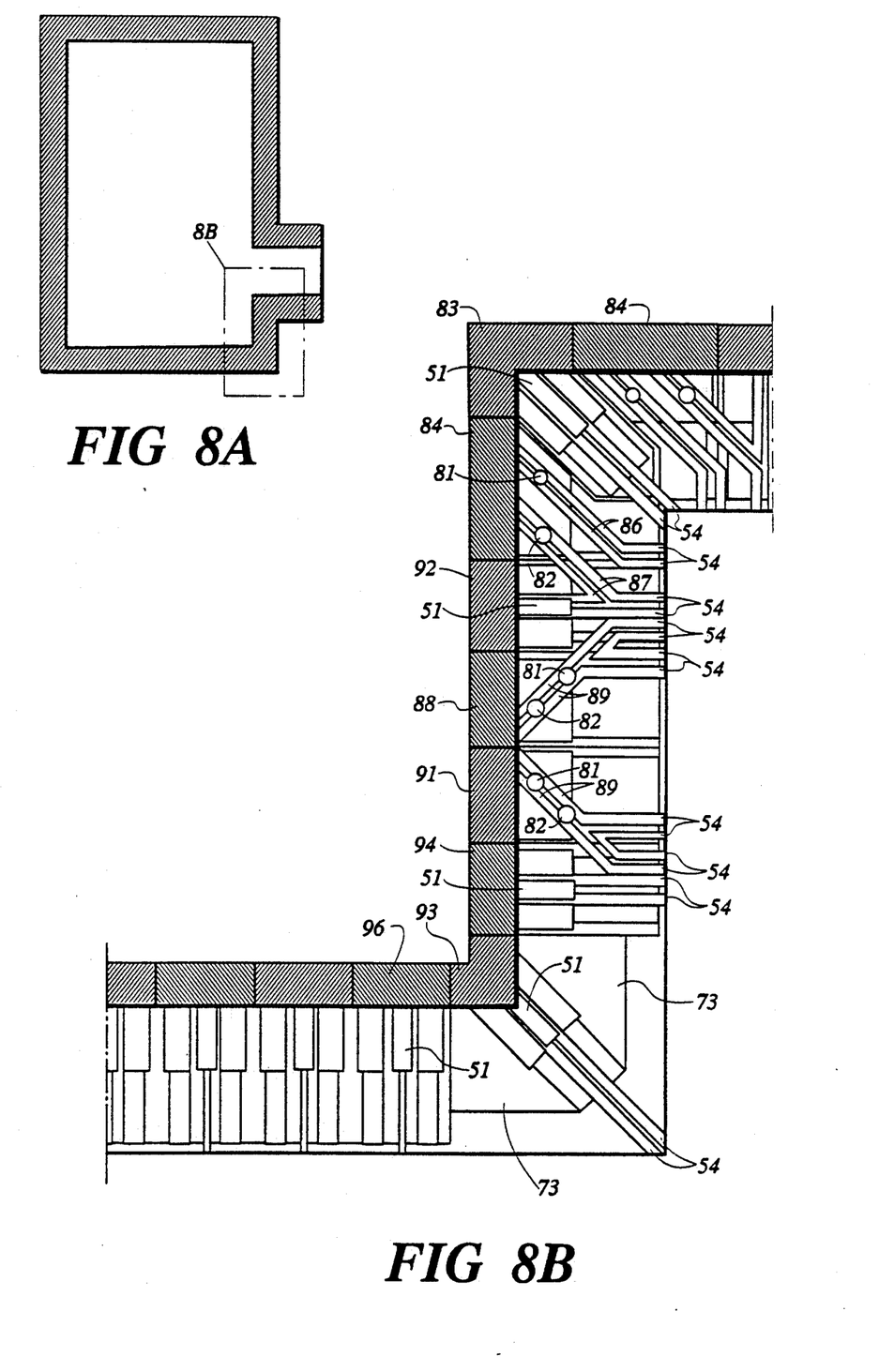
FIG. 8A is a plan cross-sectional view of a furnace, with a portion 8B thereof outlined; and, along the line 8A—8A of FIG. 1.
FIG. 8B is a detailed plan view of the portion 8B of FIG. 8A showing the furnace wall at the level of the hangers for the tuckstone assemblies, illustrating the track configuration involved in both inwardly and outwardly projecting corners.

FIG. 7 illustrates a tuckstone assembly 14 for placement at position 84 next to an inwardly projecting corner assembly 84 as shown in FIGS. 5 and 8B. As will be more apparent in the discussion of FIG. 8B, the tuckstone assembly 14 of FIG. 7 has a semi-trapezoidal plan view configuration, and, because of its shape and because of limitations on access, it is necessary to replace the T-hanger of the previously discussed tuckstones with headed pins 81 and 82 for mounting and positioning within the furnace wall. In FIG. 7, there is shown in dashed lines, a tool for retracting upper nose block 37 into its high profile operative position. The tool comprises an elongated arm with one end pivotally mounted in eye 34 of pin 33, and a shorter arm pivotable with respect to the long arm having one end pivotally mounted in eye 47 of pin 46. Rotation of the upper part of the long arm in a clockwise direction will pull block 37 back into its operative position, at which point the tool can be removed. The tool as shown illustrates an arrangement for moving the blocks relative to each other.

In FIG. 8A there is shown a sectional plan view of the furnace along the line 8A—8A of FIG. 1, and an enlarged detail 8B showing both outwardly projecting and inwardly projecting corner tuckstone arrangements. To avoid confusion, each of the tuckstone assemblies to be discussed is given its own identifying number. In the enlarged detail in FIG. 8B, inwardly projecting corner tuckstone assembly 83 is suspended from track 54 mounted on the underside of support member 19, by means of T-hanger 51. Installation is simple, the top movable block 37 is rotated forward, tuckstone 83 inserted and pushed forward into position, and block 37 rotated back into its operative position. Next-to-outside corner tuckstone assemblies 84 and are suspended from a pair of tracks 86 and 87 by means of headed pins 81 and 82. For insertion, upper block 37 is rotated forward, and the assembly is pushed in along tracks 86 and 87, which, as can be seen, have straight portions 54 from which tracks 86 and 87 branch off at a forty-five (45°) angle.

Tuckstone assembly 88 of FIG. 8B illustrates the insertion arrangement when there is a triangular bracket 22 (not shown) in the way. Tuckstone assembly 88 has a cut-out 52 for clearing bracket 22, and is suspended from tracks 89, which branch off at a 45° angle from tracks 54, by means of headed pins 81 and 82. Insertion is similar to that of tuckstone assembly 84. In a like manner, tuckstone assembly 91 is inserted, with the mounting arrangement and insertion sequence being a mirror image of tuckstone assembly 88. With tuckstone assemblies 88 and 91 in place, tuckstone assembly 92 can be inserted straight in. Outside corner tuckstone assembly 93 is inserted straight in along its track 54, after which tuckstone assemblies 94 and 96 may be inserted straight in. Whenever anyone of tuckstone assemblies 83, 84, 88, 91, 92, 93, 94 or 96 is to be removed, only tuckstone assemblies 92, 94 and 96 can be removed without the necessity of removing any adjacent tuckstone assembly. However, if, for example, corner tuckstone assembly 93 is to be removed, tuckstone assemblies 94 and 96 must first be removed so that block 37 of tuckstone assembly 93 may be rotated forward for its removal. Tuckstone assembly 94 must also be removed to permit removal of tuckstone assembly 91, and tuckstone assembly 92 must be removed to permit removal of tuckstone assembly 88. By the same token, tuckstone assemblies 92 and both of tuckstone assembly 84 must be removed to permit removal of inside corner tuckstone assembly 83. In accordance with the features of the present invention, removal of any of the tuckstone assemblies are a relatively simply process, as is clear from the foregoing.

From the foregoing, it can be seen that the hot replaceable tuckstone assemblies of the present invention do not necessitate shutting down the furnace, furnace life is extended, furnace capacity increased, melt quality is improved, the energy consumption rate of the furnace stays relatively constant, and hot repair expenses are virtually eliminated.

The foregoing specification and drawings illustrate the principals of the present invention in a preferred embodiment thereof. Numerous variations or modifications may occur to workers in the art without departure from the spirit and scope of the invention.

I claim:

1. An industrial type furnace having an interior heating chamber, an exterior, and having a support plate for supporting at least a portion of the wall of the furnace,
   a tuckstone assembly adapted to be installed in the furnace wall in a space between the support plate and the furnace wall beneath said support plate, said tuckstone assembly comprising:
   a support block including a front end portion for extending toward the heating chamber of the furnace and a rear end portion for extending toward the exterior of the furnace and an upper surface,
   a nose block supported by said support block and having a front end portion for facing the heating chamber of the furnace and a rear end portion for extending toward the exterior of the furnace and a lower surface, said lower surface being shaped to mate with the upper surface of said support block to form a slip joint therewith,
   the mating surfaces of said support block and said nose block being shaped to change the vertical height of said tuckstone assembly when said blocks are moved with respect to each other along their slip joint,
   whereby the blocks can be arranged with each other in a low vertical profile configuration and moved into the space between the support plate and the furnace wall beneath the support plate and moved with respect to each other along their slip joint to increase their vertical profile and fill the space.

2. An industrial type furnace as claimed in claim 1 wherein the shape of said upper surface of said support block of said tuckstone assembly is convex, and the shape of said lower surface of said nose block is concave.

3. An industrial type furnace as claimed in claim 1 wherein said front end portion of said nose block has an extended nose portion adapted to mask the support plate assembly from the hating chamber of the furnace when said tuckstone assembly is installed in the furnace in an operative configuration.

4. An industrial type furnace as claimed in claim 3 wherein said nose portion comprises first and second arms extending at an angle to each other.

5. An industrial type furnace as claimed in claim 4 wherein said first and second arms form an outwardly projecting corner when said tuckstone assembly is installed in the furnace in an operative configuration.

6. An industrial type furnace as claimed in claim 4 wherein said first and second arms form an inwardly projecting corner when said tuckstone assembly is installed in the furnace in an operative configuration.

7. An industrial type furnace as claimed in claim 4 wherein said arms form a ninety degree angle.

8. An industrial type furnace as claimed in claim 1 and further comprising means for suspending said tuckstone assembly from the underside of the support plate.

9. An industrial type furnace as claimed in claim 8 wherein said means for suspending comprises a support bracket for supporting said support block.

10. An industrial type furnace as claimed in claim 9 and further comprising a T-hanger mounted on said support bracket.

11. An industrial type furnace as claimed in claim 9 and further comprising headed pins mounted on said support bracket.

12. An industrial type furnace as claimed in claim 9 wherein said mounting bracket is in the form of an inverted U having depending arms having distal ends, said movable block being free to move between said depending arms.

13. An industrial type furnace as claimed in claim 12 wherein said support block has first and second mounting grooves, and the distal end of each of said depending arms has a flange adapted to ride in one of said mounting grooves.

14. A tuckstone assembly for an industrial furnace having a hot heating chamber and having a support member, the support member supporting a portion of the wall of the furnace and having an underside, said tuckstone assembly being adapted to shield the support member from the heating chamber of the furnace and having an interior end portion for facing the heating chamber of the furnace and an exterior end portion for facing away from the heating chamber and comprising:

a support block having an upper surface and a nose block having a lower surface adapted to mate with said upper surface to form a slip joint between said blocks whereby when said tuckstone assembly is inserted in an opening in the wall of the furnace the support block and the nose block are moved with respect to each along said slip joint to place the nose block in position to shield the support member.

15. A tuckstone assembly as claimed in claim 14 wherein said nose block has a front end and a rear end, said front end having an elongated nose portion extending upwardly from said nose block.

16. A tuckstone assembly as claimed in claim 15 wherein said nose block has a front end and a rear end, and said lower surface extends from said front end to said rear end.

17. A tuckstone assembly as claimed in claim 16 wherein said support block has a front end and a rear end and said upper surface of said support block extends from said front end to said rear end thereof.

18. A tuckstone assembly as claimed in claim 14 and further comprising a support bracket for supporting said support block.

19. A tuckstone assembly as claimed in claim 14 wherein said upper surface is convex and said lower surface is concave.

20. A tuckstone assembly as claimed in claim 14 and comprising means forming a slotted track affixed to the underside of the support member, a support bracket for supporting said support block, and means mounted on said support bracket adapted to ride in said track.

21. A tuckstone assembly as claimed in claim 20 wherein said means mounted on said support bracket comprises a T-hanger.

22. A tuckstone assembly as claimed in claim 20 wherein said means mounted on said support bracket comprises at least one headed pin.

23. A tuckstone assembly as claimed in claim 20 wherein said slotted track extends from the exterior of the furnace to a point adjacent the interior of the furnace.

24. A tuckstone assembly as claimed in claim 23 wherein said slotted track has a first portion adjacent the exterior of the furnace and a second portion extending from said first portion at an angle thereto.

25. An industrial furnace of the type including a sidewall structure including a tank section and a superstructure section positioned above said tank section and an elongated laterally extending metal support plate extending between said tank section and said superstructure section, and a tuckstone structure positioned at said metal support plate to shield the metal support plate from heat within the furnace, said tuckstone structure comprising a series of tuckstone assemblies positioned along the length of said metal support plate and each tuckstone assembly including a nose block and a support block, said nose block including a main body portion and an enlarged nose portion at one end of said main body portion, said main body portion shaped to juxtapose said metal support plate and said enlarged nose portion shaped to shield the metal support plate from heat emitted from within the furnace when the main body portion is juxtaposed said metal support plate, said support block and said nose block each including facing surfaces shaped to form a slip joint therebetween so that when the nose block has been placed with its enlarged nose portion projected into the furnace beyond the metal support plate the support block and nose block can be moved relative to each other to move the nose block to a position adjacent said metal support plate to shield it.

* * * * *